United States Patent [19]
Zhang

[11] Patent Number: 6,092,459
[45] Date of Patent: Jul. 25, 2000

[54] PANCAKE COOKING APPARATUS AND METHOD

[76] Inventor: Li Feng Zhang, 265 W. 22nd Pl., Chicago, Ill. 60616

[21] Appl. No.: 09/295,516

[22] Filed: Apr. 21, 1999

[51] Int. Cl.[7] .............................. A47J 27/00; A47J 37/00; A47L 13/022; A47L 13/08
[52] U.S. Cl. ................................ 99/355; 99/357; 99/373; 99/374; 99/375; 99/422; 99/423; 15/143.1; 15/236.02
[58] Field of Search ............................. 99/374, 422, 425, 99/375, 373, 423, 352–355, 357, 339, 340; 15/236.01, 143.1, 236.02; 30/169, 296.1, 298, 312, 314; 294/25, 57, 58

[56] References Cited

U.S. PATENT DOCUMENTS 3,719,507  3/1973  Bardeau ..................................... 99/375
4,970,949  11/1990 Ferrara, Jr. et al. ...................... 99/374

*Primary Examiner*—Timothy Simone
*Attorney, Agent, or Firm*—Joan I. Norek; Law Office of Joan I. Norek

[57] ABSTRACT

A pancake cooking apparatus has an elongate and preferably open-ended griddle and a batter scraper by which a mass of batter is spread from one end of the griddle to the other. Thickness uniformity is realized by structures for keeping the scraper's edge and the griddle's cooking surface spaced a fixed distance apart during the batter spreading step. The pancake cooking apparatus at times includes a plurality of side-by-side griddles for high-volume manual cooking operations. A method for cooking uniformly thin, rectangular pancakes uses the cooking apparatus.

14 Claims, 3 Drawing Sheets

6,092,459

PANCAKE COOKING APPARATUS AND METHOD

BACKGROUND OF THE INVENTION

The conventional technique of cooking pancakes encompasses the steps of (1) pouring a thin batter onto a flat and normally pre-heated griddle surface, whereby a substantially rounded and flat pad is formed, (2) leaving the batter pad to cook on its downward or first side, (3) flipping the partially-cooked batter pad over, and (4) leaving the batter pad to cook on its opposite or second side. This conventional process normally produces a pancake that has a browned skin or casing on each side.

The dimensions of a pancake cooked by the conventional technique are at least partially controlled by the flow characteristics of the batter and the amount of batter poured. For a given amount of batter poured, a thinner batter will spread out more than a thicker batter, forming a wider and thinner pancake. The spreading of the batter is generally outward from the pouring point, except of course in any direction in which spreading is impeded, such as by a physical barrier. Any partial cooking or heating of the batter during its spreading will modify its flow characteristics and generally slow or diminish spreading.

Conventional pancake cooking techniques using conventional apparatus will not produce multiple pancakes of uniform size, shape and thickness unless there is a stringent uniformity imposed upon all dimension-determining factors, including without limitation the batter's flow characteristics, the amount poured, the temperature of the griddle's surface, and the modification of the batter's flow characteristics by partial cooking or heating during its spreading. Such stringent uniformity would be particularly difficult to achieve, or even approach, when using conventional techniques and conventional apparatus during high-volume manual cooking operations.

A pancake shape other than rounded can of course be produced, but generally only by using a griddle with boundary walls that delineate the desired shape plus enough batter so that it will spread out to such walls from the pouring point.

BRIEF SUMMARY OF THE INVENTION

The present invention is a pancake cooking apparatus and method for producing elongate pancake rectangles of uniform thickness and size. The apparatus is comprised of an elongate and preferably open-ended griddle and a batter scraper by which a mass of batter is spread from one end of the griddle to the other. Thickness uniformity is realized by means for keeping the scraper's edge and the griddle's cooking surface spaced a fixed distance apart during the batter spreading step. In preferred embodiments, the pancake cooking apparatus includes a plurality of side-by-side griddles for high-volume manual cooking operations.

DETAILED DESCRIPTION OF THE INVENTION

Figure 1:
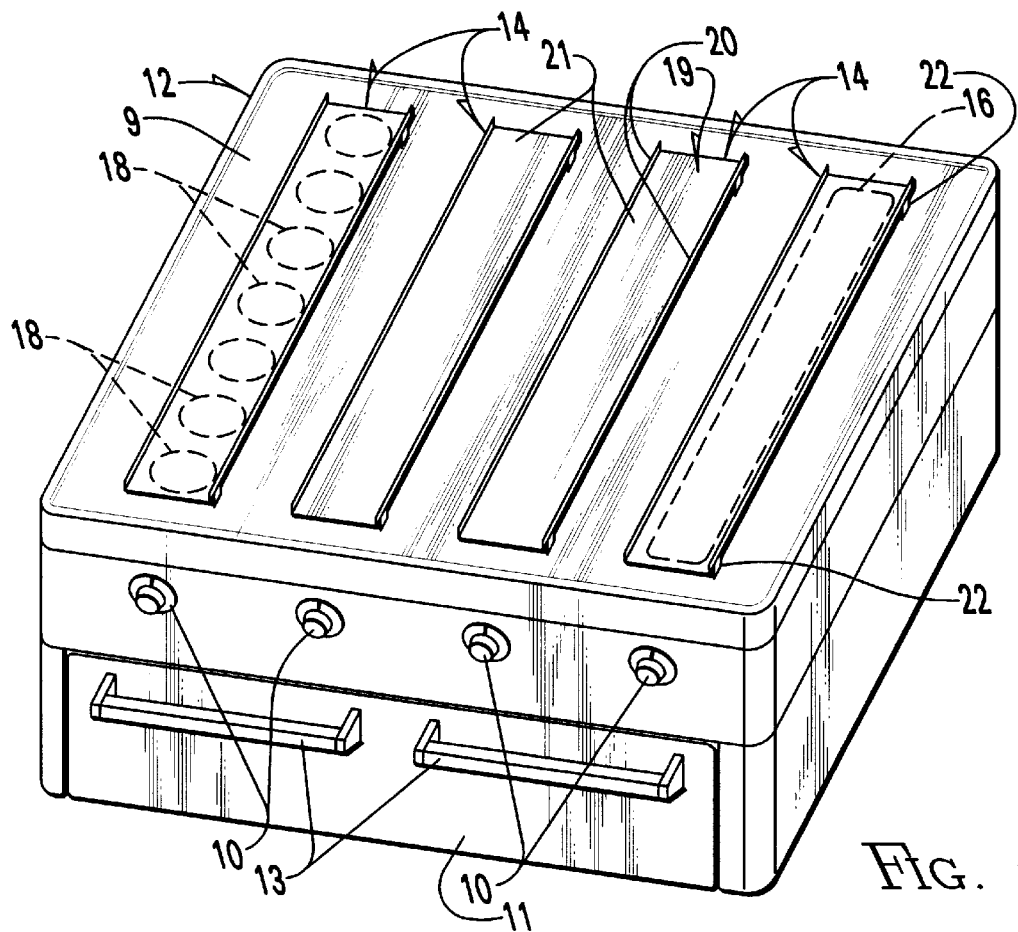
FIG. 1 is a perspective view of a stove and a plurality of elongate griddles of a pancake cooking apparatus of the invention.

In FIG. 1 there is shown a stove 12 and a plurality of elongate griddles 14 of a pancake cooking apparatus of the invention. The stove 12 (with its burners discussed below) is a source of cooking heat, preferably dry cooking heat. The stove 12 as shown is otherwise generally a conventional cooking stove having a flat top 9, a series of burner control knobs 10 and a lower compartment door 11 with handles 13. (Not shown are the conventional burner controls and internal views of the lower compartment beyond its door 11.) The four griddles 14 shown are each separately positioned above (and substantially covering) long heaters or burners 16 on the stove 12. Each burner 16 is comprised of either a single elongate heater or burner element, such as the single long burner element 17 shown in phantom under the right most griddle 14 in FIG. 1, or a plurality of heater or burner elements that together form an elongate burner, such as the small round burner elements 18 positioned in an elongated alignment as shown in phantom under the left most griddle 14 in FIG. 1. The burners can be gas or electrical cooking elements of the general type used in conventional gas and electric stoves, shaped as is necessary to provide sufficiently uniform heating over the entirety of the given elongate burner, and thus providing sufficiently uniform heat to the given griddle 14. Any other cooking heat could be used, as long as it provides an appropriate degree of sufficiently uniform heat along the lengths of the griddles 14.

Figure 2:
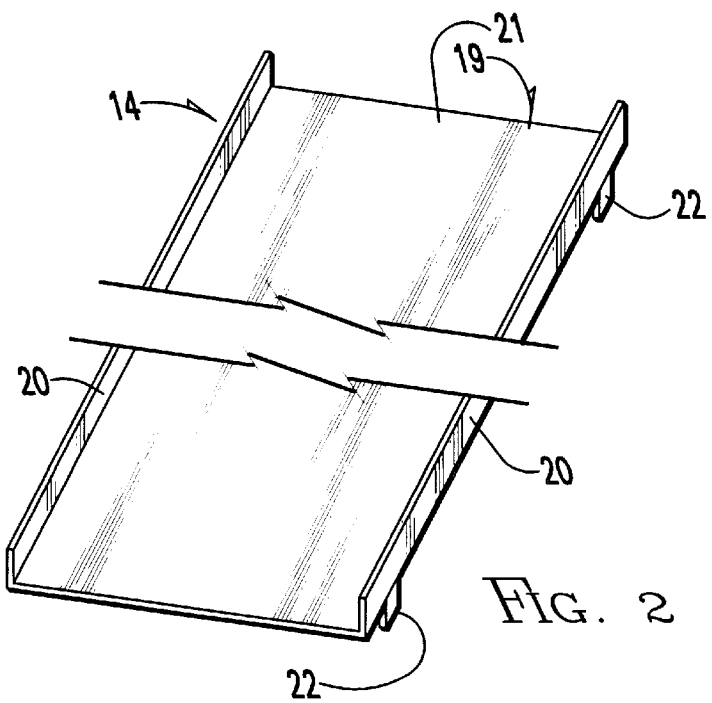
FIG. 2 is a enlarged, sectioned perspective view of one of the elongate griddles of the pancake cooking apparatus of FIG. 1.

Referring now also to FIG. 2, the griddles 14 are shallow, flat-bottom plates or pans that can be formed of any suitable cookware material, such as a metal, such as iron, or metal alloy, with or without a cookware coating, such as Teflon. The griddles 14 as shown are each comprised of a substantially flat bottom member 19, a pair of substantially straight side walls or right-angle flanges 20, and four legs 22. The upper surfaces 21 of the bottom members 19 are the griddles' cooking surfaces. As shown, and in preferred embodiment, the griddles 14 are open-ended at both ends, and are supported on the stove 12 by their four legs 22. Each griddle 14 has a leg 22 sufficiently proximate each of its four corners to provide stable support to the griddle 14. The griddles 14 could be formed without the legs 22 and placed directly on the burners or on a burner grate (not shown), but a more secure anchoring of the griddles 14 to the stove 12 is preferably provided via the legs 22 as discussed below. In addition, uniform heating of the entire length of the bottom members 19 of the griddles 14 is realized when the legs 22 or other means of support hold the bottom members 19 of the griddles 14 sufficiently above yet still sufficiently proximate the burners so that the griddles 14 are in heat transfer communication with the source of cooking heat.

Figure 3:
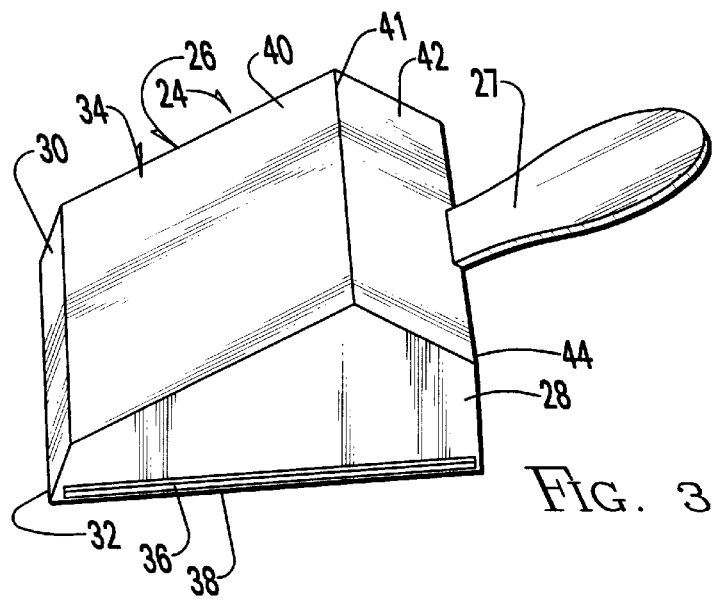
FIG. 3 is a perspective view of a pancake batter scraper of a cooking apparatus of the invention oriented with the handle towards the rear of the view.
Figure 4:
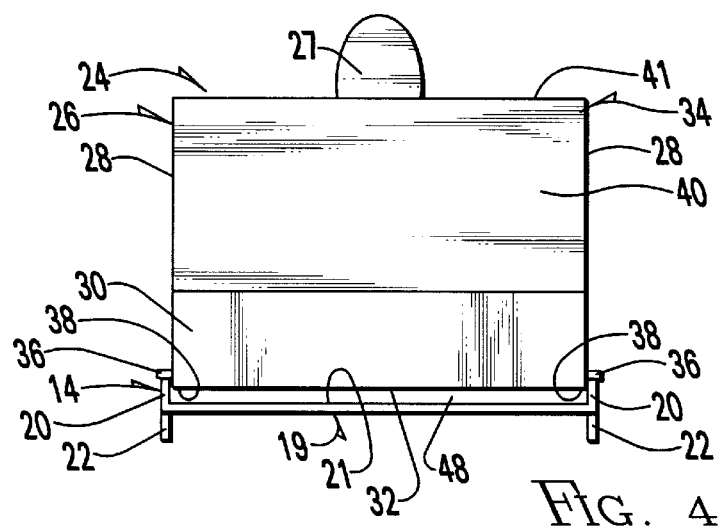
FIG. 4 is a front end view of the pancake batter scraper of FIG. 3 seated upon the griddle of FIG. 2.
Figure 5:
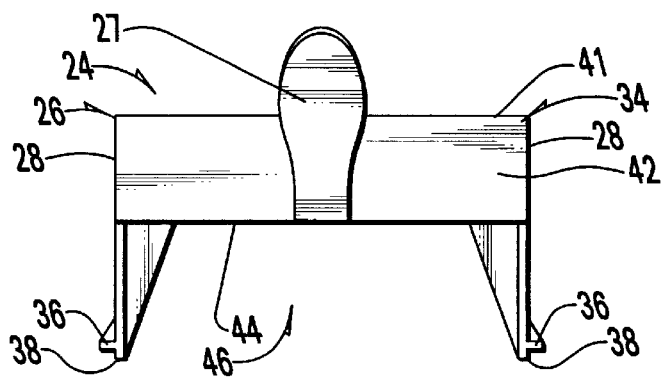
FIG. 5 is a rear end view of the pancake batter scraper of FIG. 3 oriented with the handle towards the front of the view.

In FIG. 3 and FIG. 4 there is shown a batter scraper 24 of the pancake cooking apparatus of the invention. The batter scraper 24 is comprised of a body section 26 and a grip or handle 27. The body section 26, when held in the normal use orientation, is a downwardly-open receptacle that is comprised of a pair of side walls 28, an end wall 30 having an exposed scraping edge 32, and a peaked top wall 34. The side walls 28 each have an outwardly protruding detent strip or flange 36 positioned spaced from but approximately parallel their bottom edges 38. The side walls 28 lie in substantially parallel planes and are sized to fit sufficiently snugly between the griddle flanges 20 of the griddles 14 up to the level of their detent flanges 36. (As discussed below, the side walls 28 and griddle flanges 20 together provide a barrier that is substantially impermeable to batter during the pancake cooking process of the invention.) The detent flanges 36 will bear against the tops of the griddle flanges 20, keeping the scraper's body section 26, and particularly the scraping edge 32 of the end wall 30, a fixed distance above the griddle's cooking surfaces 21. The scraper's body section 26 thus will seat on the griddles 14, the scraper's detent flanges 36 bearing against the griddles' side flanges 20.

As described in more detail below, the distance between the scraping edge 32 of the end wall 30 and the cooking surface 21 of the griddle 14 will determine the thickness of the batter layer that is cooked, and thus for a given type of batter the thickness of the resultant pancake. Most pancakes will expand somewhat, or rise, during the cooking process, and a pancake will usually be somewhat thicker than the batter layer. Nonetheless batter layers of reasonably uniform thicknesses will produce pancakes of reasonably uniform thicknesses.

The distance between the scraping edge 32 of the end wall 30 and the cooking surface 21 of the griddle 14, as mentioned above, should be a fixed distance. This distance is determined by the seated height of the batter scraper 24 off the cooking surface 21, which in turn is determined by the height of the griddle flanges 20. Therefore the height of the griddle flanges 20 must remain substantially constant over their lengths.

When the batter scraper 24 is seated on a griddle 14, a gap or slit 48 is formed between the scraper's end wall 30 and the griddle's cooking surface 21, which slit 48 is bounded at its sides by the griddle's flanges 20 together with the sections of the scraper's side walls 28 that extend below the detent flanges 36. The height of the slit 48 is determined by the height of the griddle flanges 20 measured from the griddle cooking surface 21 to the top of the flanges 20 minus the height of the sections of the scraper's side walls 28 that extend below the detent flanges 36. This relationship can be expressed by Formula 1:

$$H_F - H_{WB} = H_S \qquad \text{Formula 1}$$

wherein, in Formula 1, $H_F$ is the height of the griddle flanges 20 measured from the griddle cooking surface 21 to the top of the flanges 20, $H_{WB}$ is the height of the sections of the scraper's side walls 28 that extend below the detent flanges 36, and $H_S$ is the height of the slit 48.

In preferred embodiment, the slit 48 is a very narrow slit, and $H_S$ is only about 5 millimeters or less. In more preferred embodiment, $H_S$ is only about 3 millimeters or less. In even more preferred embodiment, $H_S$ is no more than about 1.5 millimeters, or 2 millimeters. As discussed in more detail below, the pancake cooking apparatus and the pancake cooking method of the present invention permit the manual production of multiple very thin pancakes having a uniform thinness not only throughout the length of a given pancake, but also a thinness that is substantially uniform from pancake to pancake. The layer of batter that is spread on the griddle's cooking surface 21 will have a depth substantially equal to $H_S$. The layer of batter that is spread on the griddle's cooking surface 21 will be substantially continuous up to its boundary edges. To assure the even spreading of the batter between, and up to, the griddle flanges 20, the mound of poured batter preferably has a depth (or height) substantially greater than $H_S$ (so that the action of the batter scraper 24 also spreads the batter mound outward) and preferably approaches extending from one flange 20 to the other. It is believed that such uniformly thin batter layers could not be formed manually before the pancake cooking apparatus and pancake cooking method of the present invention. The pancake cooking apparatus and pancake cooking method of the present invention not only enable such uniformly thin batter layers to be formed, but also, as seen from the descriptions below, the thin batter layers can be formed rapidly by substantially unskilled operators.

As noted above, batters commonly rise somewhat during the cooking process. The thickness of the pancake product is nonetheless related to the height of the batter layer, and can be expressed by Formula 2:

$$H_S \times R_B = H_P \qquad \text{Formula 2}$$

wherein $H_S$ is the height of the slit 48 as defined above for Formula 1, $R_B$ is the degree of rise as the batter cooks to a pancake (for instance a 10% rise would equal an $R_B$ of 0.1), and $H_P$ is the height of the resultant pancake.

When the scraper's body section 26 is seated on a griddle 14, in preferred embodiment and as shown, the end wall 30 slopes inward. Preferably the slope of the end wall 30 is at least 50 from normal, and preferably no more than about 40° from normal. In other words, the arc between the plane of the end wall 30 and the plane in which both side wall bottom edges 38 lie is preferable from about 50° (end wall slope of about 40° from normal) to about 85° (end wall slope of about 5°). An end wall slope from normal of at least about 15° is more preferred.

The peaked top wall 34 is comprised of a first and a second top member 40, 42. The first top member 40 is joined to the end wall 30 and both side walls 28. The first top member 40 has a lesser degree of slope (from the horizontal) than the end wall 30. Preferably the slope of the first top member 40 is at least 40° from normal, and preferably no more than about 70° from normal. In other words, the arc between the plane of the first top member 40 and the plane in which both side wall bottom edges 38 lie is preferably from about 50° (first top member slope of about 40° from normal) to about 30° (first top member slope of about 70°). A first top member slope from normal of at least about 45° is more preferred.

The second top member 42 is joined to the first top member 40 and to both side walls 28. The second top member 42 slopes downwardly from the peak 41. As shown and preferably, the smallest arc between the plane of the second top member 42 and the plane in which both side wall bottom edges 38 lie is from about 50° to about 30°. As shown and preferably, the second top member 42 extends from the top wall's peak 41 down only about half way to the plane in which the side wall bottom edge's both lie, or less, leaving an open end or outlet 46 opposite the end wall 30. The handle 27 is attached to the second top member 42 in any convenient, and preferably balanced position, such as proximate its exposed edge 44. The handle 27 might be formed in any shape and size that is appropriate for reasonable gripping of the scraper 24 by hand and drawing or pulling the scraper 24 towards the user, as is described below.

Figure 6:
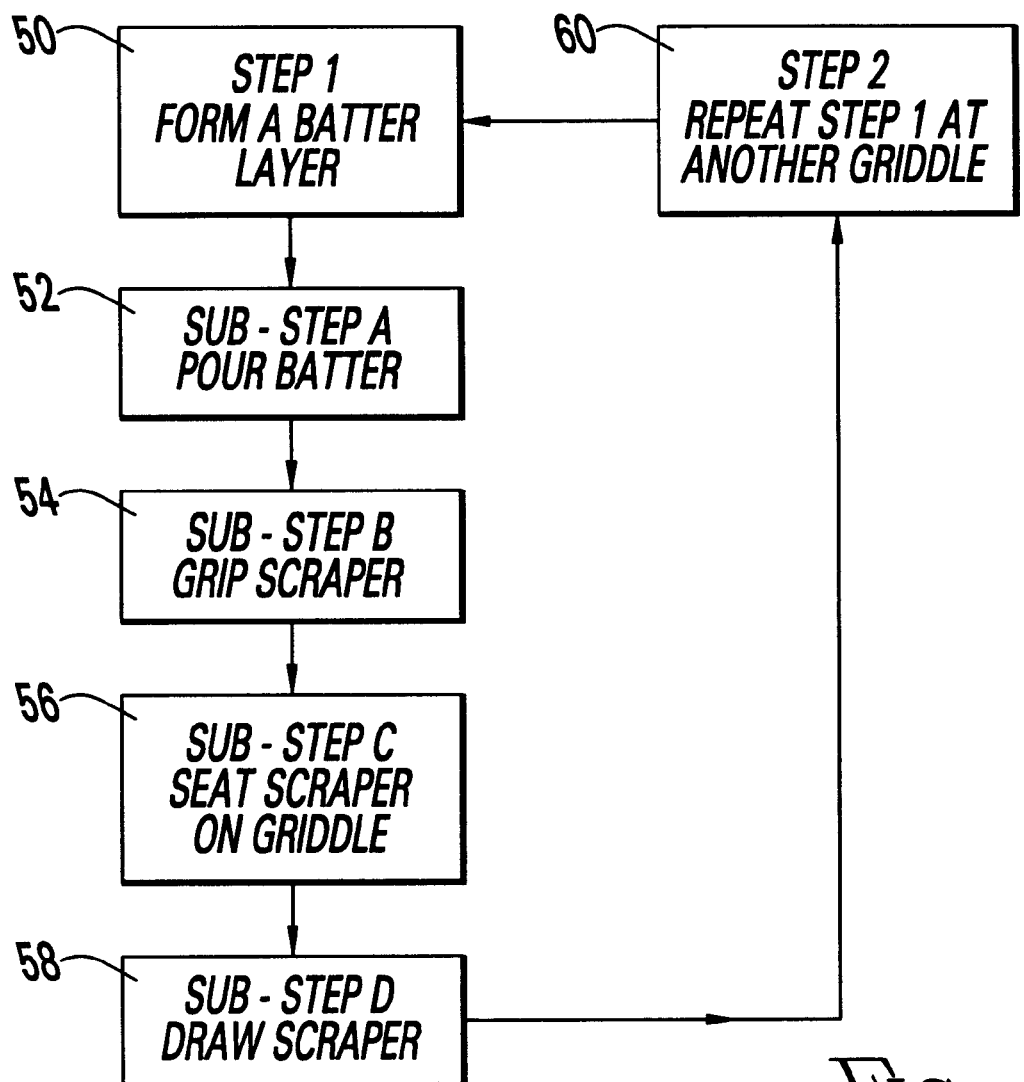
FIG. 6 is a flow diagram of the pancake cooking method of the invention.

Referring now also to the flow diagram of FIG. 6, the first step of the cooking method, shown at station 50, is to form a layer of batter on one of the griddles 14. The first step is comprised of four sub-steps. Sub-step (a), shown at station 52, is to pour a sufficient amount of batter onto the far end of one of the griddles 14. The second sub-step, sub-step (b), shown at station 54, is to grip the batter scraper 24 by its handle 27 unless the batter scraper 24 is already being gripped by its handle 27. The third sub-step, sub-step (c), shown at station 56, is to seat the batter scraper 24 on the griddle 14 over and/or behind the poured batter, the scraper being oriented with its handle towards the user and its end wall 30 away from the user. The fourth sub-step, sub-step (d), shown at station 58, is to draw or slide the batter scraper 24 towards the near end of the griddle 14, that is, towards the user, while keeping the scraper 24 seated on the griddle 14, the griddle flanges 20 acting as tracks on which the scraper 24 slides. During the third sub-step the batter is spread into a layer of a thickness determined by the distance between the scraping edge 32 of the end wall 30 and the griddle's cooking surface 21. In preferred embodiment, the amount of batter poured is sufficient to form a layer of batter that extends from one griddle flange 20 to the other at least along most of the length of the griddle 14. Excess batter can be drawn out of the griddle 14 at its near open end. An open-ended far end permits the batter to be poured close to the far end and the scraper 24 placed over the batter without interference. Preferably the griddle 14 is pre-heated. Preferably the stove 12 has a plurality of griddles 14 as shown, and the step 1 is repeated at each of the griddles 14 in turn. Preferably the batter is sufficiently thin to permit the scraper 24 to be easily drawn down the length of the griddles 14. Preferably the method includes a second step, shown at station 60, of repeating step 1 at any griddle 14 that does not have a layer of batter. Preferably the method also includes a third step of removing pancakes from the griddles when sufficiently cooked. The batter can be any sufficiently fluid flour and fluid admixture. The batter fluid can be water or another fluid, and the batter can optionally contain additional ingredients.

When the scraper 24 is drawn toward the operator, the batter mass moves along with it, being urged along by the end wall 30 and being entrapped between the end wall 30 and side walls 28, except for the batter layer that passes under the scraping edge 32 of the end wall 30. As the scraper 24 is drawn toward the operator and the end wall 30 meets the poured mass of batter, the batter mass will flow sideways as it is urged along with the scraper, whereby the layer passing under the scraping edge 32 of the end wall 30 will extend from one side wall 28 to the other, and thereafter possibly fill in the gap to the inner sides of the griddle flanges 20. In preferred embodiment, the scraper's side walls 28 are relatively thin, for instance preferably being no thicker than about 4 millimeters, and more preferably being no thicker than about 2 millimeters. The scraper's top wall 34 prevents batter from flowing out over the end wall 30. The scraper's side walls 28 prevent batter from flowing out over the griddle's flanges 20. The outlet 46 opposite the end wall 30 permits any excess batter to flow ahead of the scraper 24. The outlet 46 opposite the end wall 30 also permits the scraper 24 to be initially seated on the griddle 14 behind or partly behind the poured batter and to enclose or corral the batter as the scraper 24 is drawn towards the operator. The forward and upward slopes of the scraper's end wall 30 and first top member facilitate the urging or propelling of the batter mass along with the scraper 24. The downward slope of the second top member 42 facilitates confining the batter mass within the scraper 24 by urging any rising mounds of batter downward.

Because the scraper 24 is drawn along the length of the griddles 14, the griddles 14 are preferably fixed in position on the stove 12, such as via conventional mechanical fasteners holding the legs 22 of the griddles 14 in a fixed position relative the stove 12. It would of course be undesirable if the griddles 14 could be displaced or misaligned from their positions over the burners during the batter spreading operation.

The pancake cooking apparatus and method permit batter to be spread into a plurality of long rectangular layers of substantially uniform sizes, shapes and thicknesses, and cooked to produce long rectangular pancakes of substantially uniform sizes, shapes and thicknesses. An operator who is pouring the batter with one hand and operating the batter scraper 24 with the other hand, can lay down a uniform layer of batter along the length of a griddle 14 in seconds, for instance from about four to about six or seven seconds. Alternatively, a second operator stationed behind the stove 12 can pour the batter and the first operator just draws the batter down the length of the griddles 14. As shown and in preferred embodiment, the stove 12 has many long burners over which are set many side-by-side substantially parallel griddles 14. The operator can easily move from one griddle 14 to the next griddle 14 laying down uniform, long rectangles of batter. The operator can easily spread batter on four griddles in less than a minute, and a reasonably proficient operator can easily do that in about thirty seconds or less. The cooking apparatus and method of the present invention are particularly advantageous when employed in high volume manual cooking operations, such as on-site cooking of the long rectangular pancakes in a fast-food establishment. The uniformity of the sizes, shapes and thicknesses of the pancakes is achieved without the exercise of any particular skill of the operator. The pancakes are particularly useful for producing rolled food products, such as by covering a cooking or cooked pancake with a filling, and then rolling the pancake up into a cylindrical shape. A uniformly thin pancake is desirable for such a purpose. The cooking apparatus suitable for a high volume manual cooking operation should have at least two burners and at least two griddles, and preferably at least four burners and at least four griddles. The maximum numbers are set by practical considerations such as the available space and the desired cooking volume. All of these advantages of the invention are intensified when the height of the slit 48 ($H_S$), and thus the height (or depth) of the batter layer, is only 5 millimeters or less, and even more so when $H_S$ is only 3 millimeters or less, or no more than about 1.5 millimeters or 2 millimeters.

Referring to FIG. 1 through 6 for reference where practicable, the present invention in an embodiment is a pancake cooking apparatus comprised of: (1) a plurality of the elongate griddles 14 in heat transfer communication with the source of cooking heat, the griddles 14 each having a cooking surface 21; (2) a batter scraper 24; and optionally (3) a source of cooking heat. The batter scraper 24 has a body section 26 and an attached handle 27. The body section 26 in its normal operating orientation is seated upon one of the griddles 14, and is slidable along the length of the griddle 14 upon which it is seated. The body section 26 has a leading and trailing end. The trailing end (the end wall 30 end of the body section 26) has a scraping edge 32 positioned a fixed distance above the cooking surface 21 of the griddle 14 upon which it is seated. The body section 26 is open between the scraping edge 32 and the cooking surface 21, that opening constituting a slit 48. The source of cooking heat is, in certain embodiments, the stove 12 together with its plurality of elongate burners. Preferably the griddles 14 are each comprised of a bottom member 19 that has a substantially flat upper surface, the cooking surface 21, and a pair of spaced flanges 20. In preferred embodiment, the body section 26 of the batter scraper 24 is comprised of the pair of side walls 28, the end wall 30 which has the exposed scraping edge 32, and the top wall 34. The side walls 28 of the body section 26 each have an outwardly protruding detent flange 36 positioned spaced from but approximately parallel the bottom edges of the side walls 28. The side walls 28 of the scraper's body section 26 fit snugly between the griddle flanges 20 up to the level of the detent flanges 36, the detent flanges 36 bearing against the tops of the griddle 14 flanges. The griddles 14 are preferably supported above the burners by a plurality of legs 22 affixed to the stove 12, and are open-ended at both ends. The end wall 30 of the scraper 24 preferably slopes upward and inward. The top wall 34 of the scraper 24 is preferably a peaked top wall comprised of a first top member 40 and a second top member 42. The first top member 40 is joined to the end wall 30 and both of the side walls 28, and the first top member 40 has a greater upward and inward slope than the end wall 30. The second top member 42 is joined to the first top member 40 and to both side walls 28, and the second top member 42 slopes downward. In preferred embodiment, in Formula 1:

$$H_F - H_{WB} = H_S \qquad \text{Formula 1}$$

wherein $H_F$ is the height of the griddle 14 flanges measured from the griddles 14 cooking surface 21 to the top of the flanges, $H_{WB}$ is the height of the sections of the scraper 24's side walls 28 that extend below the detent flanges 36, and $H_S$ is the height of the slit, $H_S$ is about 5 millimeters or less. In more preferred embodiment, $H_S$ is about 3 millimeters or less.

The pancake cooking apparatus of the present invention in preferred embodiment is for a high volume manual cooking operation. The stove 12 has a plurality of elongate burners and the apparatus includes a plurality of elongate griddles 14 each affixed above and in heat transfer communication with one of the burners. The apparatus includes at least one batter scraper 24 movable from a seated position on any of the griddles 14 to a position remote from the griddles. The batter scraper 24 has a pair of side walls 28, an end wall 30 and a top wall, and the side walls 28 each have an external detent flange 36. Each of the detent flanges 36 bears against the top of one of the flanges of one of the griddles 14 when the batter scraper 24 is in the seated position. The end wall 30 is spaced from the cooking surface 21 when the batter scraper 24 is in the seated position allowing fluid flow out of the scraper 24 between the end wall 30 and the cooking surface 21 when the batter scraper 24 is in the seated position, or in other words, through the slit 48. The top wall 34 blocks fluid flow from within the scraper 24 out over the end wall 30 when the batter scraper 24 is in the seated position. The flanges of one of the griddles 14 and the side walls 28 and the top wall 34 together block fluid flow from within the scraper 24 out through the sides of the scraper 24 when the batter scraper 24 is in the seated position. The end wall 30 slopes inward at least 5° from normal. The top wall 34 preferably is comprised of a first top member 40 and a second top member 42. The first top member 40 is joined to the end wall 30 and both of the side walls 28. The first top member 40 has a greater slope than the slope of the end wall 30. The second top member 42 is joined to the first top member 40 and to both of the side walls 28, and the second top member 42 slopes downwardly. Preferably, for manual operation, there is a handle 27 attached to the second top member 42, that is, proximate the scraper's leading end.

The present invention preferably is also a pancake cooking method using the cooking apparatus of the invention, and the method is comprised of:

(step one) forming a layer of batter on one of the griddles 14 from a far end of the griddle 14 to a near end of the griddle 14 by performing sub-steps a through d of (sub-step a) pouring a sufficient amount of batter onto the far end of one of the griddles, (sub-step b) then gripping the batter scraper 24 by the handle 27 unless the batter scraper 24 is already is gripped by its handle 27, (sub-step c) seating the batter scraper 24 on the griddle 14 over the poured batter, the scraper 24 is seated oriented with the handle 27 towards the user and the trailing end away from the user, and (sub-step d) drawing the batter scraper 24 from the far end of the griddle 14 towards the near end of the griddle 14 while keeping the scraper 24 seated on the griddle, whereby the batter flows out of the batter scraper 24 at the trailing end of the scraper 24 and forms a batter layer on the cooking surface 21 of the griddle 14 of a thickness determined by the distance between the scraping edge 32 of the trailing end and the cooking surface 21.

In the pancake cooking method the griddle 14 is preferably pre-heated. The method preferably further includes the step of repeating sub-steps (a) through (d) at one of the griddles 14 that does not already have a layer of batter on its cooking surface 21. Preferably sub-steps (a) through (d) are repeated multiple times, until all griddles 14 have a layer of batter. Preferably the batter is spread into a plurality of long rectangular layers of substantially uniform sizes, shapes and thicknesses, and cooked to produce long rectangular pancakes of substantially uniform sizes, shapes and thicknesses. Preferably, in Formula 1:

$$H_F - H_{WB} = H_S \qquad \text{Formula 1}$$

wherein $H_F$ is the height of the griddle 14 flanges measured from the griddles 14 cooking surface 21 to the top of the flanges, $H_{WB}$ is the height of the sections of the scraper 24's side walls 28 that extend below the detent flanges 36, $H_S$ is the height of the slit, $H_S$ is about 5 millimeters or less, and more preferably $H_S$ is about 3 millimeters or less.

Preferably the griddle flanges 20 are from about 4 to about 12 millimeters high, and more preferably the griddle flanges 20 are from about 6 to about 10 millimeters high. Preferably the griddles 14 (or griddle cooking surfaces 21) are from about 8 to about 20 centimeters wide (inside of flange measurement), and from about 30 to about 70 centimeters long. More preferably, the griddles 14 (or griddle cooking surfaces 21) are from about 8 to about 16 centimeters wide (inside of flange measurement), and from about 40 to about 60 centimeters long. The width of the scraper's end wall 30 is about the same width as the griddle 14 (inside the flanges 20).

It is well within the skill of a person in the technical field, upon becoming conversant with, or otherwise having knowledge of, the present invention, to select suitable numbers and sizes of burners and griddles and the like in view of the type of cooking apparatus being designed and/or constructed.

The above described embodiments are exemplitive, and the terminology is employed for illustration purposes and not limitation purposes. The present invention is not limited to the combinations and subcombinations illustrated herein.

I claim:

1. A pancake cooking apparatus comprised of:

at least one elongate griddle in heat transfer communication with a source of cooking heat, said griddle having a cooking surface; and a batter scraper having a body section and an attached handle, said body section in its normal operating orientation being seated upon said griddle, being slidable along the length of said griddle, and having a leading and trailing end, said trailing end having a scraping edge positioned a fixed distance above said cooking surface of said griddle, and said body section being open below said scraping edge.

2. The pancake cooking apparatus of claim 1 wherein said source of cooking heat is a stove having a plurality of elongate burners.

3. The pancake cooking apparatus of claim 1 wherein:

said griddle is comprised of a cooking surface and a pair of spaced flanges;

said cooking surface is a substantially flat surface;

said body section of said batter scraper is comprised of a pair of side walls, an end wall and a top wall, said scraping edge of said trailing end is an edge of said end wall;

each of said side walls has a bottom edge and an outwardly protruding detent flange positioned spaced from but approximately parallel said bottom edge, and said body section in its normal operating orientation sets snugly between said pair of spaced flanges of said griddle, said detent flanges bearing against said griddle flanges, and said scraping edge and said cooking surface are spaced apart and together form a slit having a height equal to the distance between said scraping edge and said cooking surface.

4. The pancake cooking apparatus of claim 3 wherein:

said source of cooking heat includes a plurality of burner elements; and said griddle has a plurality of legs and is supported above said burner elements by said plurality of legs.

5. The pancake cooking apparatus of claim 3 wherein said griddle is open-ended at both longitudinal ends.

6. The pancake cooking apparatus of claim 3 wherein said end wall of said scraper slopes upward and inward between said scraping edge and said top wall.

7. The pancake cooking apparatus of claim 3 wherein said top wall of said scraper is comprised of a first top member and a second top member joined together at a peak, said first top member is also joined to said end wall and to both of said side walls, said first top member slopes upward to said peak and has a greater inward slope than said end wall, said second top member is also joined to both of said side walls, and said second top member slopes downward from said peak.

8. The pancake cooking apparatus of claim 3 wherein, when said body section in its normal operating orientation, said height of said slit is no more than about 5 millimeters.

9. The pancake cooking apparatus of claim 8 wherein said height of said slit is no more than about 3 millimeters.

10. The pancake cooking apparatus of claim 1 wherein said handle is attached to said body section at said leading end.

11. The pancake cooking apparatus of claim 7 wherein said handle is attached to said second top member.

12. The pancake cooking apparatus of claim 7 wherein, when said body section in its normal operating orientation, said second top member is spaced apart from said cooking surface.

13. The pancake cooking apparatus of claim 1 further including a second elongate griddle having a cooking surface.

14. The pancake cooking apparatus of claim 13 wherein said second elongate griddle is in heat transfer communication with said source of cooking heat.

* * * * *